(12) United States Patent
Lakkapragada et al.

(10) Patent No.: US 11,669,880 B2
(45) Date of Patent: Jun. 6, 2023

(54) SYSTEM AND METHOD FOR CUSTOMIZATION OF AN EYEWEAR

(71) Applicant: Kiksar Technologies Private Limited, Bangalore (IN)

(72) Inventors: Kiran Lakkapragada, Bangalore (IN); Kavita Jha, Bangalore (IN)

(73) Assignee: Kiksar Technologies Private Limited

( * ) Notice: Subject to any disclaimer, the term of this patent is extended or adjusted under 35 U.S.C. 154(b) by 135 days.

(21) Appl. No.: 17/467,585

(22) Filed: Sep. 7, 2021

(65) Prior Publication Data

US 2022/0114636 A1    Apr. 14, 2022

(30) Foreign Application Priority Data

Oct. 8, 2020    (IN) .............................. 202041043757

(51) Int. Cl.
*G06Q 30/00*    (2023.01)
*G06Q 30/0601*    (2023.01)
(Continued)

(52) U.S. Cl.
CPC ....... *G06Q 30/0621* (2013.01); *G02C 13/003* (2013.01); *G06Q 20/305* (2013.01);
(Continued)

(58) Field of Classification Search
None
See application file for complete search history.

(56) References Cited

U.S. PATENT DOCUMENTS 9,341,867 B1 *   5/2016   Kim .................... A61B 3/0025
10,698,236 B2    6/2020   Fonte et al.
(Continued)

FOREIGN PATENT DOCUMENTS

EP    3631770 A1    4/2020

OTHER PUBLICATIONS

Knockaround; https://knockaround.com/products/custom-premiums-sunglasses#/p/_prod_vsgqd3p0h, 2021.
(Continued)

*Primary Examiner* — Mila Airapetian
(74) *Attorney, Agent, or Firm* — Jason C. Cameron

(57) ABSTRACT

A system and method for customization of an eyewear is disclosed. The system includes a face scanning subsystem configured to scan a face of a user to capture one or more predefined details, an eyewear display subsystem configured to display one or more collections of the one or more components, an eyewear customization subsystem configured to receive a selection input representative of one or more components selected from the one or more collections, a first level eyewear customization subsystem configured to receive one or more customization input representative of one or more customization parameters, an eyewear assembling subsystem configured to assemble the eyewear associated with the user, a testing subsystem configured to test in real time, one or more customized eyewear, a second level eyewear frame eyewear customization subsystem configured to customize the one or more customization parameters in real time.

11 Claims, 9 Drawing Sheets

(51) Int. Cl.
*G06T 7/50* (2017.01)
*G08B 21/18* (2006.01)
*G06Q 20/30* (2012.01)
*G02C 13/00* (2006.01)
*G06V 40/16* (2022.01)

(52) U.S. Cl.
CPC .............. *G06T 7/50* (2017.01); *G06V 40/166* (2022.01); *G06V 40/168* (2022.01); *G08B 21/18* (2013.01); *G06T 2207/30201* (2013.01)

(56) References Cited

U.S. PATENT DOCUMENTS

| | | | |
|---|---|---|---|
| 11,069,153 B1* | 7/2021 | Bassett | G06T 19/20 |
| 11,579,472 B2* | 2/2023 | El-Hajal | G02C 13/001 |
| 2015/0061166 A1* | 3/2015 | Van De Vrie | G02C 13/003 |
| | | | 264/1.7 |
| 2016/0299360 A1* | 10/2016 | Fonte | G06T 19/20 |
| 2019/0033624 A1 | 1/2019 | Breuninger et al. | |
| 2019/0146243 A1 | 5/2019 | Parandian et al. | |
| 2021/0065285 A1* | 3/2021 | Goldberg | G06T 19/20 |
| 2021/0088811 A1* | 3/2021 | Varady | G06V 40/171 |

OTHER PUBLICATIONS

Topology; https://www.topologyeyewear.com/, 2021.
Your Eye Wear; https://www.youreyewear.com/en/pconfigurator/step0, 2021.

* cited by examiner

SYSTEM AND METHOD FOR CUSTOMIZATION OF AN EYEWEAR

EARLIEST PRIORITY DATE

This application claims priority from a complete patent application filed in India having Patent Application No. 202041043757, filed on Oct. 8, 2020 and titled "SYSTEM AND METHOD FOR CUSTOMIZATION OF AN EYEWEAR".

FIELD OF INVENTION

Embodiments of a present disclosure relates to eyewear, and more particularly to, a system and a method for customization of an eyewear.

BACKGROUND

Eyewear is generally used by a user for various purposes such as protection, weak eyesight and making a fashion statement. Therefore, to cater the various purposes of the eyewear for the user, the user might want to have a customized or made as one-of-a kind eyewear tailored to the user.

Traditionally, a user goes to a store for purchasing the eyewear which often requires visiting multiple stores. Moreover, the user must explore unmanageable array of options to find an option of the eyewear suitable for him/her. However, the stores are unable to provide the user an option for customizing and personalizing the eyewear in accordance with various needs of the user due to which the user usually has to compromise between fit, style, color, shape, price and the like.

Nowadays, there are various systems available, which allow the users to customize the eyewear, wherein the user has to provide one or more videos of the face of the user to develop a three-dimensional model of the face of the user. Further, the system provides the user with some standard frames to choose from, which restricts the user with limited number of frame options. Moreover, such systems do not allow adjustments to the three-dimensional model in real time and allow only restricted modifications to the frames such as customizing a nose pad of the frame, due to which the frames selected by the user are not displayed in a best possible way on the three-dimensional model of the face. Also, the restricted modifications force the user to compromise on a desirable fit, a style, a color and the like.

Hence, there is a need for system and a method for customization of an eyewear in order to address the aforementioned issues.

BRIEF DESCRIPTION

In accordance with an embodiment of the disclosure, a system for customization of an eyewear is disclosed. The system includes one or more processors. The system also includes a face scanning subsystem operable by the one or more processors. The face scanning subsystem is configured to scan a face of a user to capture one or more predefined details associated with the user in real-time using an image capturing device and generate a facial model representative of a face of the user, wherein the one or more predefined details comprise a face depth of the user and a pupillary distance of the user. The system also includes an eyewear display subsystem communicatively coupled to the face scanning subsystem and operable by the one or more processors. The eyewear display subsystem is configured to display one or more collections of the one or more components associated with the eyewear in accordance with the one or more predefined details scanned by the face scanning subsystem. The system also includes an eyewear customization subsystem operable by the one or more processors. The eyewear customization subsystem is configured to receive a selection input representative of one or more components selected from the one or more collections of one or more components of the eyewear displayed by the eyewear display subsystem.

The system also includes a first level eyewear customization subsystem within the eyewear customization subsystem operable by the one or more processors. The first level eyewear customization subsystem is configured to receive one or more customization input representative of one or more customization parameters associated with the one or more components of the eyewear, wherein the one or more customization parameters comprise at least one of a width of the frame and a height of the frame. The system also includes an eyewear assembling subsystem operable by the one or more processors. The eyewear assembling subsystem is configured to assemble the eyewear associated with the user based on the selected one or more components of the eyewear and the one or more customization inputs received by the eyewear customization subsystem. The system also includes a testing subsystem operable by the one or more processors. The testing subsystem is configured to test in real time, one or more customized eyewear received from the eyewear assembly subsystem on the facial model. The system also includes a second level eyewear frame eyewear customization subsystem within the testing subsystem operable by the one or more processors. The second level eyewear frame eyewear customization subsystem is configured to customize the one or more customization parameters in real time while testing the one or more customized eyewear on the facial model.

In accordance with another embodiment of the disclosure, a method for customization of an eyewear is disclosed. The method includes scanning a face of a user to capture one or more predefined details associated with the user in real-time using an image capturing device and generate a facial model representative of a face of the user, wherein the one or more predefined details comprise a face depth of the user and a pupillary distance of the user. The method includes displaying one or more collections of the one or more components associated with the eyewear in accordance with the one or more predefined details scanned by the face scanning subsystem. The method includes receiving a selection input representative of one or more components selected from the one or more collections of one or more components of the eyewear displayed by the eyewear display subsystem. The method includes receiving one or more customization input representative of one or more customization parameters associated with the one or more components of the eyewear, wherein the one or more customization parameters comprise at least one of a width of the frame and a height of the frame. The method includes assembling the eyewear associated with the user based on the selected one or more components of the eyewear and the one or more customization inputs received by the eyewear customization subsystem.

The method includes testing in real time, one or more customized eyewear received from the eyewear assembly subsystem on the facial model. The method includes customizing the one or more customization parameters in real time while testing the one or more customized eyewear on the facial model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
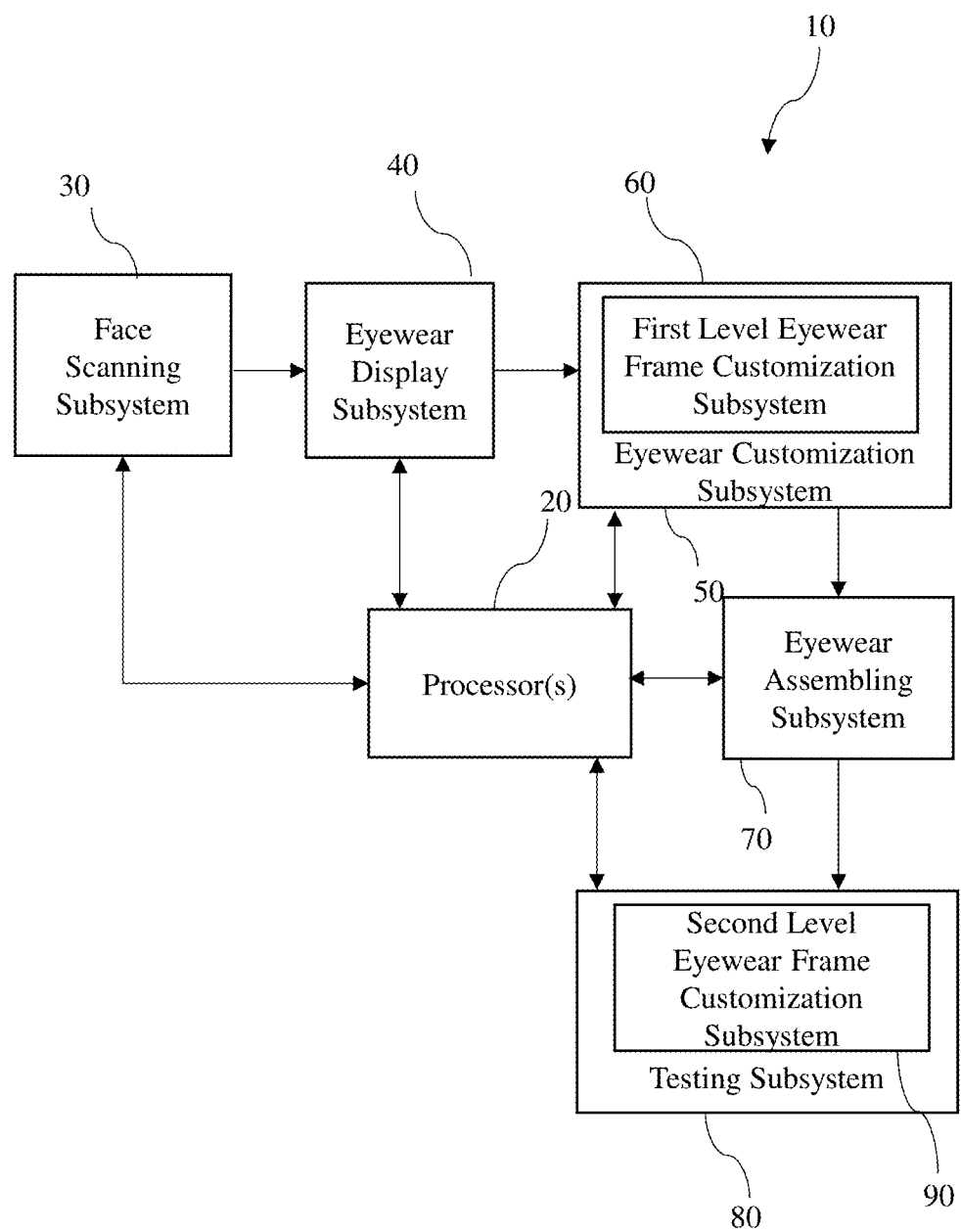
FIG. 1 is a block diagram representation of a system for customization of an eyewear in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for customization of an eyewear. The system also includes a face scanning subsystem configured to scan a face of a user to capture one or more predefined details associated with the user in real-time using an image capturing device and generate a facial model representative of a face of the user, wherein the one or more predefined details comprise a face depth of the user and a pupillary distance of the user. The system also includes an eyewear display subsystem configured to display one or more collections of the one or more components associated with the eyewear in accordance with the one or more predefined details scanned by the face scanning subsystem. The system also includes an eyewear customization subsystem configured to receive a selection input representative of one or more components selected from the one or more collections of one or more components of the eyewear displayed by the eyewear display subsystem. The system also includes a first level eyewear customization subsystem configured to receive one or more customization input representative of one or more customization parameters associated with the one or more components of the eyewear, wherein the one or more customization parameters comprise at least one of a width of the frame, a height of the frame, frame colour, frame texture, lens colour, type of nose pads and the like. The system also includes an eyewear assembling subsystem configured to assemble the eyewear associated with the user based on the selected one or more components of the eyewear and the one or more customization inputs received by the eyewear customization subsystem. The system also includes a testing subsystem configured to test in real time, one or more customized eyewear received from the eyewear assembly subsystem on the facial model. The system also includes a second level eyewear frame customization configured to customize the one or more customization parameters in real time while testing the one or more customized eyewear on the facial model.

FIG. 1 is a block diagram representation of a system 10 for customization of an eyewear in accordance with an embodiment of the present disclosure. In one embodiment, the system 10 may include a web application, mobile application and the like. In one embodiment, the system 10 is hosted in a server. In such an embodiment, the server may include a cloud server. The system 10 includes a face scanning subsystem 30 operable by the one or more processors 20. The face scanning subsystem 30 scans a face of a user to capture one or more predefined details associated with the user in real-time using an image capturing device and generate a facial model representative of a face of the user, wherein the one or more predefined details comprise a face depth of the user and a pupillary distance of the user. In such embodiment, the one or more predefined details may include, but not limited to, a face depth of the user and a pupillary distance of the user. As used herein, the term 'pupillary distance' refers to the distance between the centres of the pupils of the eyes. In one embodiment, the image capturing device may include a depth sensor camera. In such embodiment, the depth sensor camera may be used to analyse the one or more predefined details of the face of the user in real-time.

Further, in one embodiment, the face scanning subsystem 30 may scan the face of the user via one or more devices. In such embodiment, the one or more devices may include, but not limited to, a mobile phone, a computer and the like. In one embodiment, the one or more predefined details may be measured in millimetres mm.

Figure 2:
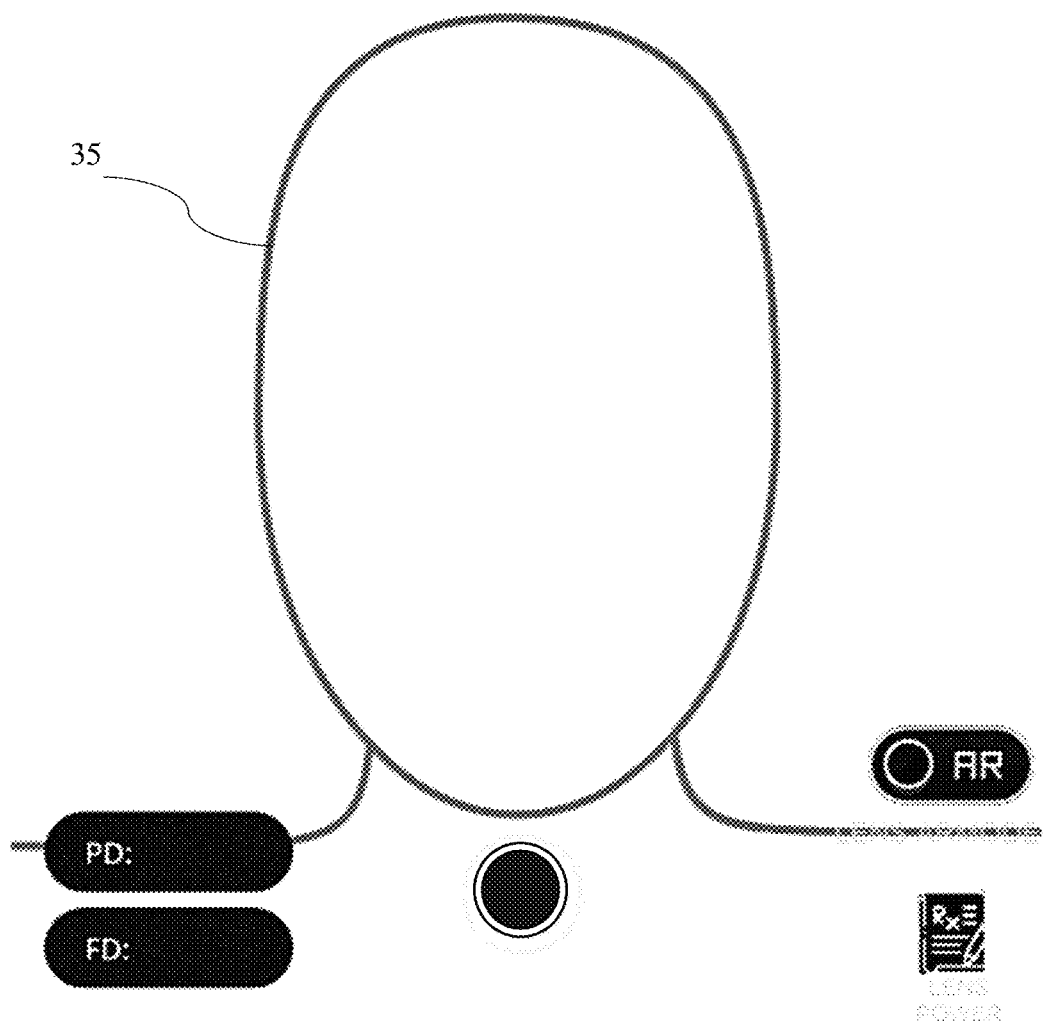
FIG. 2 illustrates an interface of the face scanning subsystem 30 in accordance with an embodiment of the present disclosure.

FIG. 2 illustrates an interface of the face scanning subsystem 30 in accordance with an embodiment of the present disclosure. The user has to align his or her face within a central facial scanning section 35 which is a function of augmented reality. Thereafter, the face scanning subsystem 30 automatically captures the face depth (FD) and the pupillary distance (PD) of the user.

Further, in one embodiment, the system 10 may include an alarm generation subsystem 35 operable by the one or more processors 20. The alarm generation subsystem 35 generates an alarm if the face scanning subsystem 30 is unable to detect the one or more predefined details. In one embodiment, the alarm generation subsystem 35 may notify the user to change an alignment of the face of the user to scan the face.

The system 10 includes an eyewear display subsystem 40 communicatively coupled to the face scanning subsystem 30 and operable by the one or more processors 20. The eyewear display subsystem 40 displays one or more collections of the one or more components associated with the eyewear in accordance with the one or more predefined details scanned by the face scanning subsystem 30. In such embodiment, the one or more components from the one or more collections may include, but not limited to, frame style, lens type of eyewear and one or more decorative items. In one embodiment, the one or more components may include, but not limited to, a frame stick, lens, a nose pad and the like. In one embodiment, the nose pad of the frame may include, but not limited to, a European nose pad and the like. In one embodiment, the eyewear display subsystem 40 may also display one or more price values associated with the eyewear. In one embodiment, the eyewear display subsystem 40 may include an information section. In a specific embodiment, the information section may include information about one or more frame styles displayed by the eyewear displaying subsystem. In a more specific embodiment, the information may include, a frame material, a temple material, one or more advantages associated with the frame style, a contact information and the like. In one embodiment, the one or more collections may be updated after a pre-defined interval of time.

Further, in one exemplary embodiment, if the one or more predefined details associated with the user and one or more preferences of the user does not match one or more needs of the user, then the user may customize the one or more customization parameters of the frame in accordance with the one or more predefined details.

Further, the system 10 includes an eyewear customization subsystem 90 operable by the one or more processors 20. The eyewear customization subsystem 50 receives a selection input representative of one or more components selected from the one or more collections of one or more components of the eyewear displayed by the eyewear display subsystem. The system 10 includes a first level eyewear frame eyewear customization subsystem 60 within the eyewear customization subsystem 50 operable by the one or more processors 20. The first level eyewear frame eyewear customization subsystem 60 receives one or more customization input representative of one or more customization parameters associated with the one or more components of the eyewear, wherein the one or more customization parameters comprise at least one of a width of the frame, a height of the frame, frame colour, frame texture, lens colour, type of nose pads and the like. In such embodiment, the one or more customization parameters may include a width of the frame, a height of the frame, frame colour, frame texture, lens colour, type of nose pads and the like. In one embodiment, the one or more customization parameters of the frame may be customized in accordance with the one or more predefined details scanned by the face scanning subsystem 70.

In one embodiment, the user may customize one or more frames of the eyewear and add the one or more frames to a wish list. In another embodiment, the user may also send one or more predefined details and the one or more preferences to the system 20 if the user is unable to find desired collection from the one or more collections via one or more connecting means. In such embodiment, the one or more connecting means may include, but not limited to, an electronic mail e-mail, a text message and the like.

Further, the system 10 includes an eyewear assembling subsystem 70 operable by the one or more processors 20. The eyewear assembling subsystem 70 assembles the eyewear associated with the user based on the selected one or more components of the eyewear and the one or more customization inputs received by the eyewear customization subsystem 50. In one embodiment, the eyewear assembling subsystem 70 may add the one or more frames to the wish list after assembling the one or more frames.

Further, the system 10 includes a testing subsystem 80 operable by the one or more processors 20. The testing subsystem 80 tests in real time, one or more customized eyewear received from the eyewear assembly subsystem on the facial model. In one embodiment, the user may swap and try the one or more frames added in the wish list of the user. The system 10 includes a second level eyewear frame eyewear customization subsystem 90 within the testing subsystem 80 operable by the one or more processors 20. The second level eyewear frame eyewear customization subsystem 90 customizes the one or more customization parameters in real time while testing the one or more customized eyewear on the facial model. In one embodiment, the user may also change a position of the one or more frames while testing the one or more frames in real-time. In one embodiment, the user may also be able to share the one or more frames with one or more people via the one or more connecting means.

Figure 3:
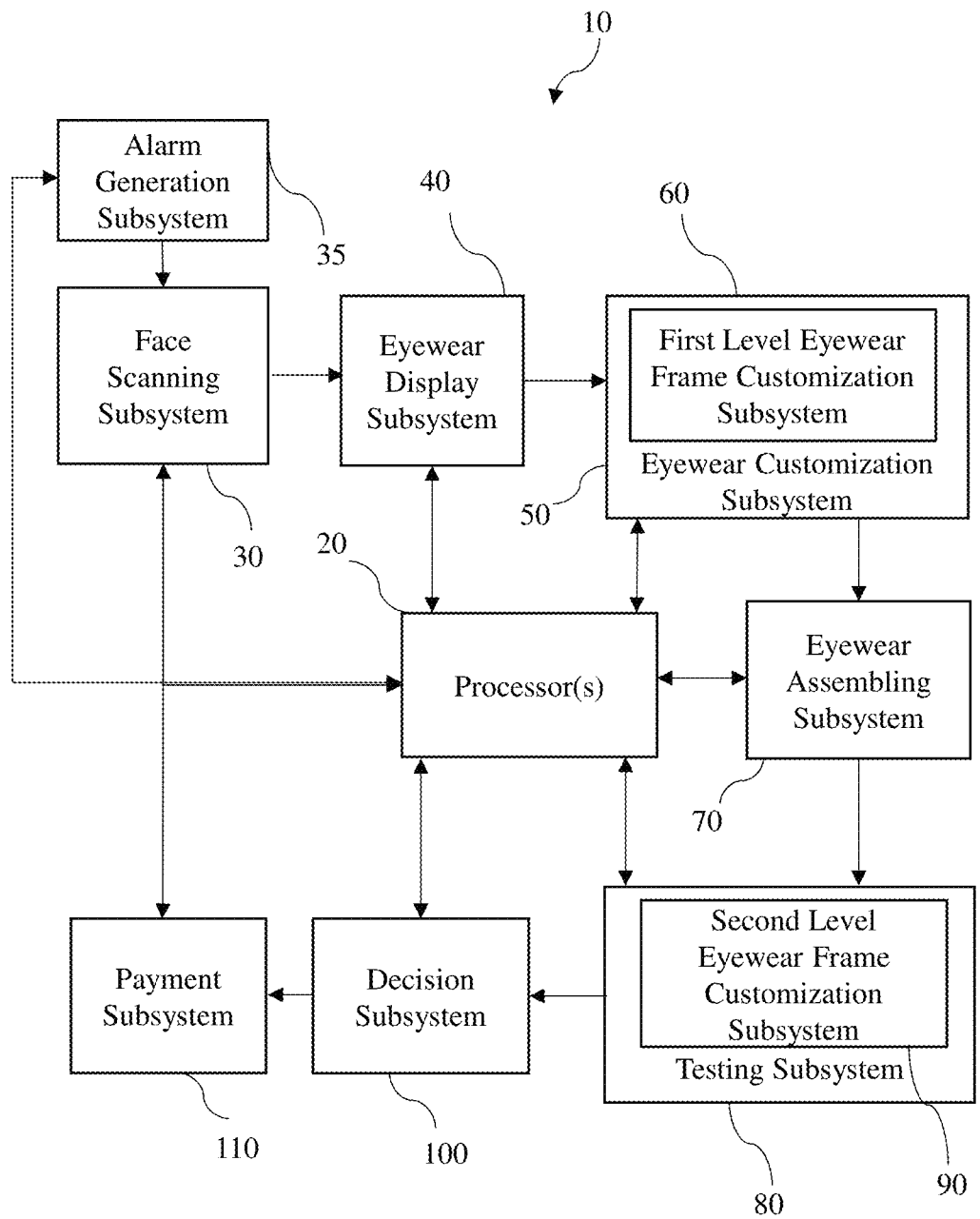
FIG. 3 is a block diagram representation of the system for customization of an eyewear of FIG. 1 in accordance with an embodiment of the present disclosure.

FIG. 3 is a block diagram representation of the system 10 for customization of an eyewear of FIG. 1 in accordance with an embodiment of the present disclosure. In addition to the face scanning subsystem 30, the eyewear display subsystem 40, the eyewear customization subsystem 50, the first level eyewear customization subsystem 60, the eyewear assembling subsystem 70, the testing subsystem 80, the second level eyewear subsystem 90, the system also includes a decision subsystem 100 and a payment subsystem 110. The system 10 includes the decision subsystem 100 operable by the one or more processors 20. The decision subsystem 100 receives a decision of one or more selected frames tested by the testing subsystem 80. In one embodiment, the system 10 includes the payment subsystem 110 communicatively coupled to the decision subsystem 100 and operable by the one or more processors 20. The payment subsystem 100 enables the user to make a payment for the one or more selected frames decided by the decision subsystem 100 via one or more online payment systems. In such embodiment, the one or more online payment systems may include, but not limited to, an online payment gateway, wallet and the like. In one embodiment, the user may provide one or more contact details during the payment checkout of the one or more selected frames. In such embodiment, the one or more contact details may include, but not limited to, a contact number, a shipping address, a landmark and the like.

Figure 4:
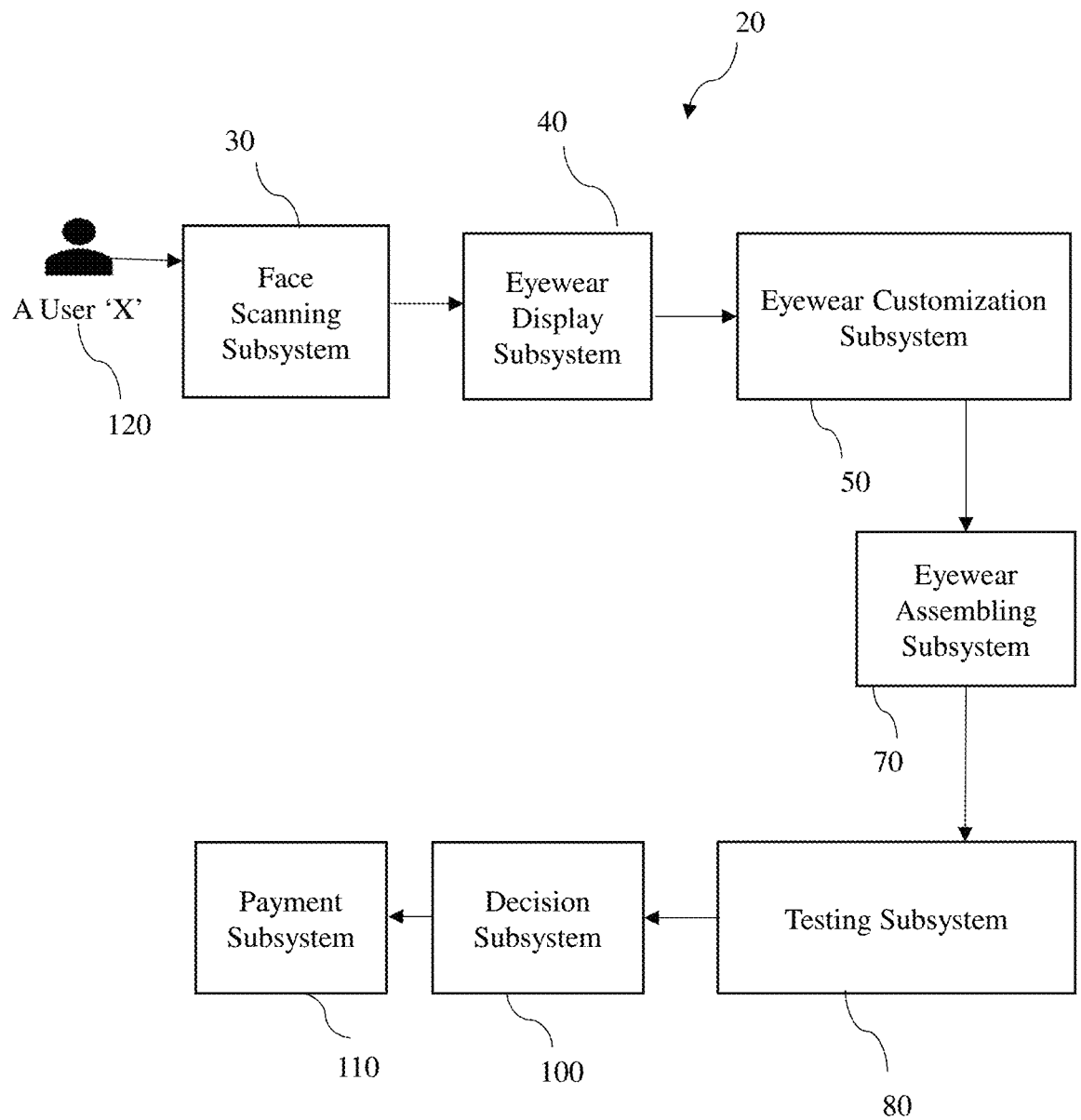
FIG. 4 is an exemplary embodiment representing a block diagram of the system for customization of an eyewear of FIG. 3 in accordance with an embodiment of the present disclosure.

FIG. 4 is an exemplary embodiment representing a block diagram of the system 10 for customization of an eyewear of FIG. 3 in accordance with an embodiment of the present disclosure. The system 10 scans a face of a user 'X' 120 to capture the face depth of the user 'X' 120 and the pupillary distance of the user 'X' 120 via the depth sensor camera by the face scanning subsystem 30. After capturing the face depth and the pupillary distance the system 10 displays the one or more components of the one or more collections to the user 'X' 120 such as the frame style, the eyewear lens type, nose pad type and the like 120 by the eyewear display subsystem 40. Moreover, the system 10 allows the user 'X' 120 to customize the one or more selected eyewear which fits the user 'X' 120 perfectly. Further, the system 10 receives a customization input from the user 'X' 120 to customize the frame style, the texture such as printed, multi coloured and the like, the frame colour, the frame temple, the lens type of the eyewear, the lens colour such as pink, yellow and the like and the one or more decorative items such one dot design, two dot design, three dot design and the like one by one by the eyewear customization subsystem 50. In one embodiment, the user 'X' 120 may select a color from one or more colours such as yellow, blue, red and the like.

After customization, the system 10 assembles the eyewear associated with the user 'X' 120 and add the eyewear to the wish list by the eyewear assembling subsystem 70. Further, the system 10 enables the user to try and test the eyewear from the wish list in real-time by the testing subsystem 80. During the testing of the eyewear the system enables the user 'X' 120 to customize the height of the eyewear and the width of the eyewear according to the user 'X' 120 in real time to fit a facial structure of the user 'X' in a best way possible. After testing, the system 10 receives an input from the user 'X' 120 to decide the eyewear by the decision subsystem 100. In such embodiment, the input may include the color of the eyewear, texture of the eyewear, lens type of the frame and the like. Further, the system 10 receives a payment from the user 'X' 120 to make the payment for the eyewear via an online payment system such as Online payment gateway by the payment subsystem 110.

Figure 5:
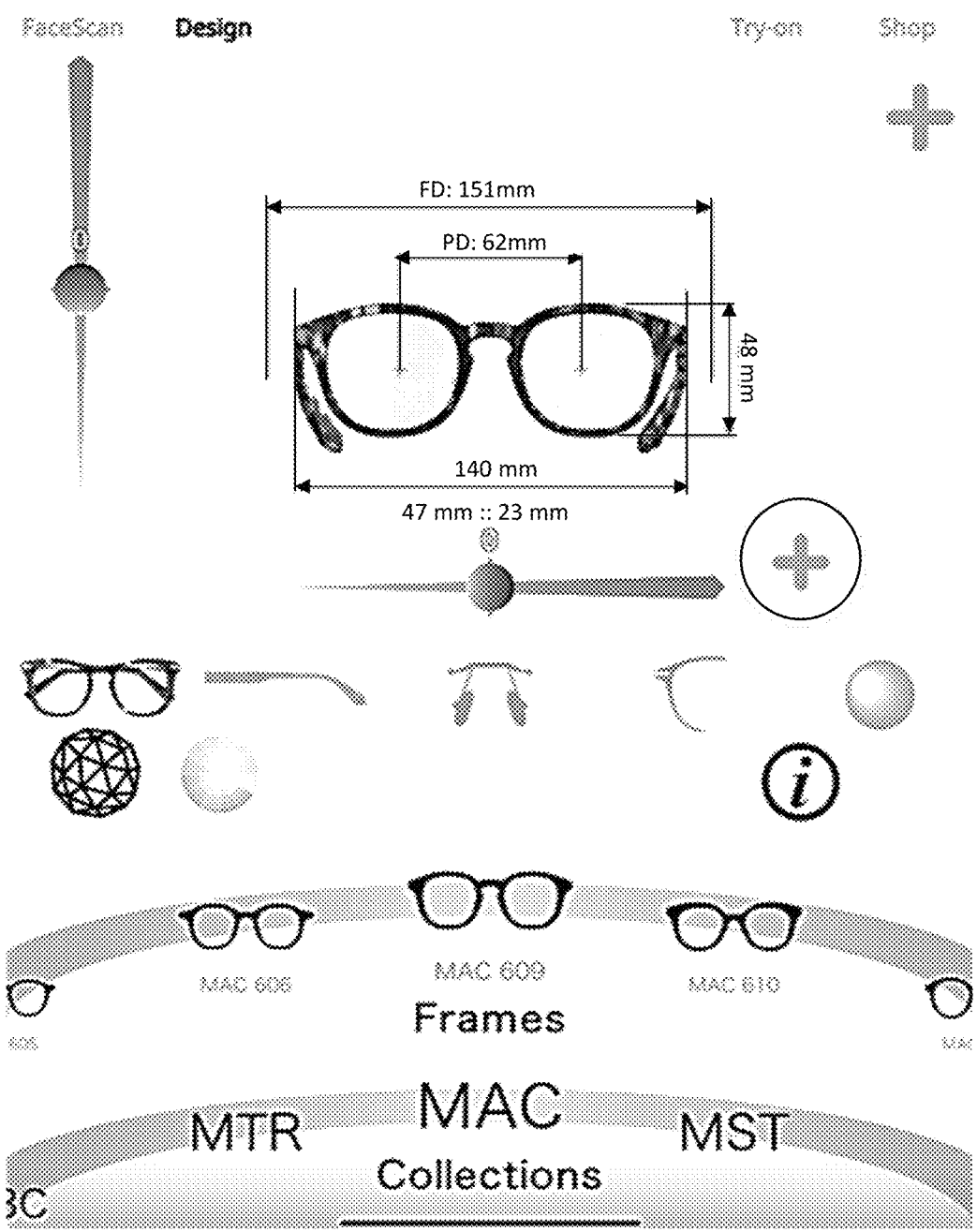
FIGS. 5 and 6 are schematic representations of an exemplary embodiments of customisation of the eyewear with respect to inputs of the user.
Figure 6:
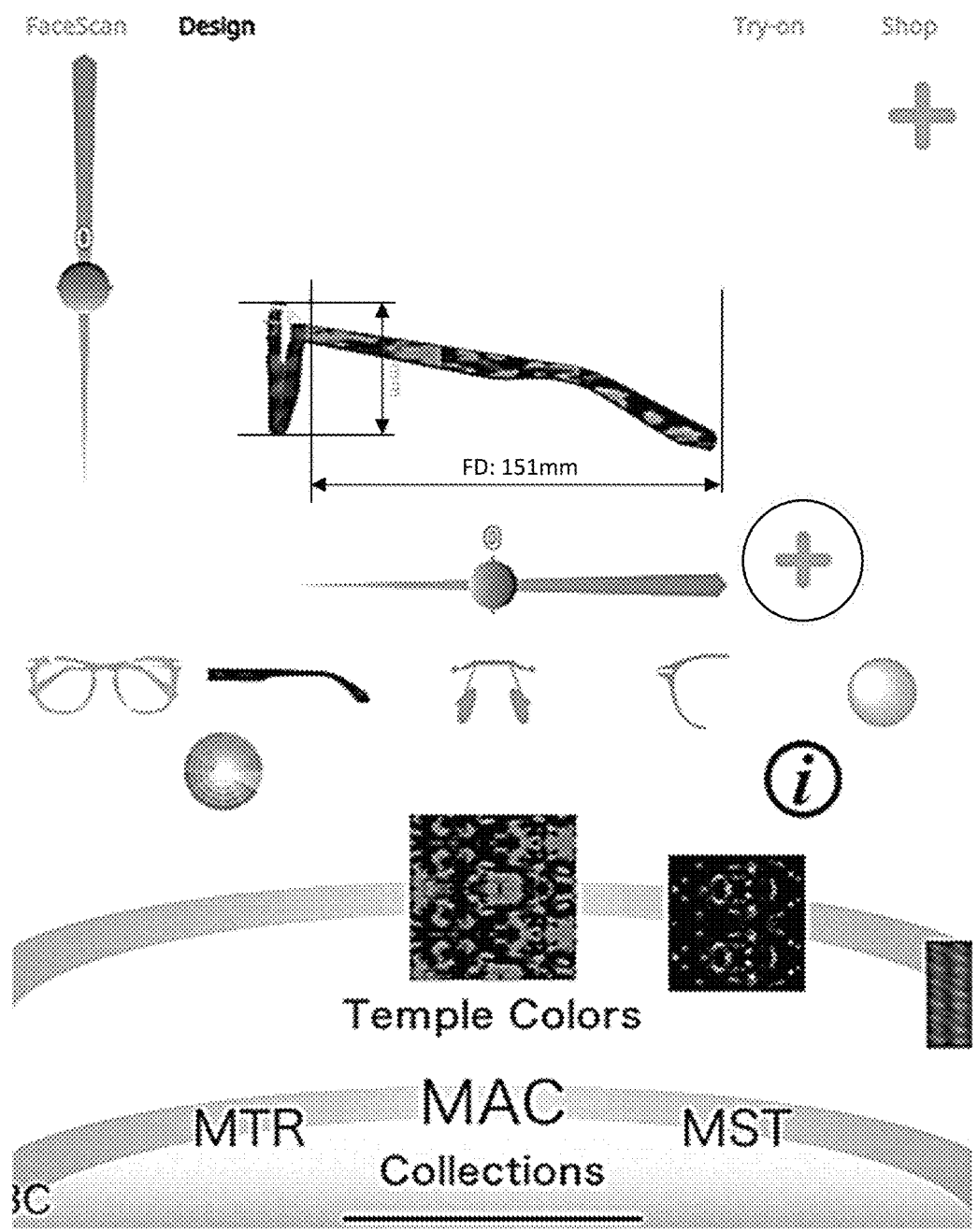

FIGS. 5 and 6 are schematic representations of an exemplary embodiment of customisation of the eyewear with respect to inputs of the user. The system displays the one or more collections such as, but not limited to, MTR, MAC, MST and the like, specific set of eyewear frames under a selected collection, options in components available with respect to a frame selected from the specific set of eyewear frames such as, but not limited to, node pads, top bar, bridges, temples, temple tips, ornamental end pieces, rivets and the like. The user being enabled to provide the selection input and configure the eyewear to his liking and in accordance with the one or more predefined details scanned by the face scanning subsystem. Further, the user is also enabled to customise the eyewear by inputting the one or more customization parameters associated with the one or more components of the eyewear to further refine fitting and adjustment of the eyewear with respect to the facial parameters of the user.

Figure 7:
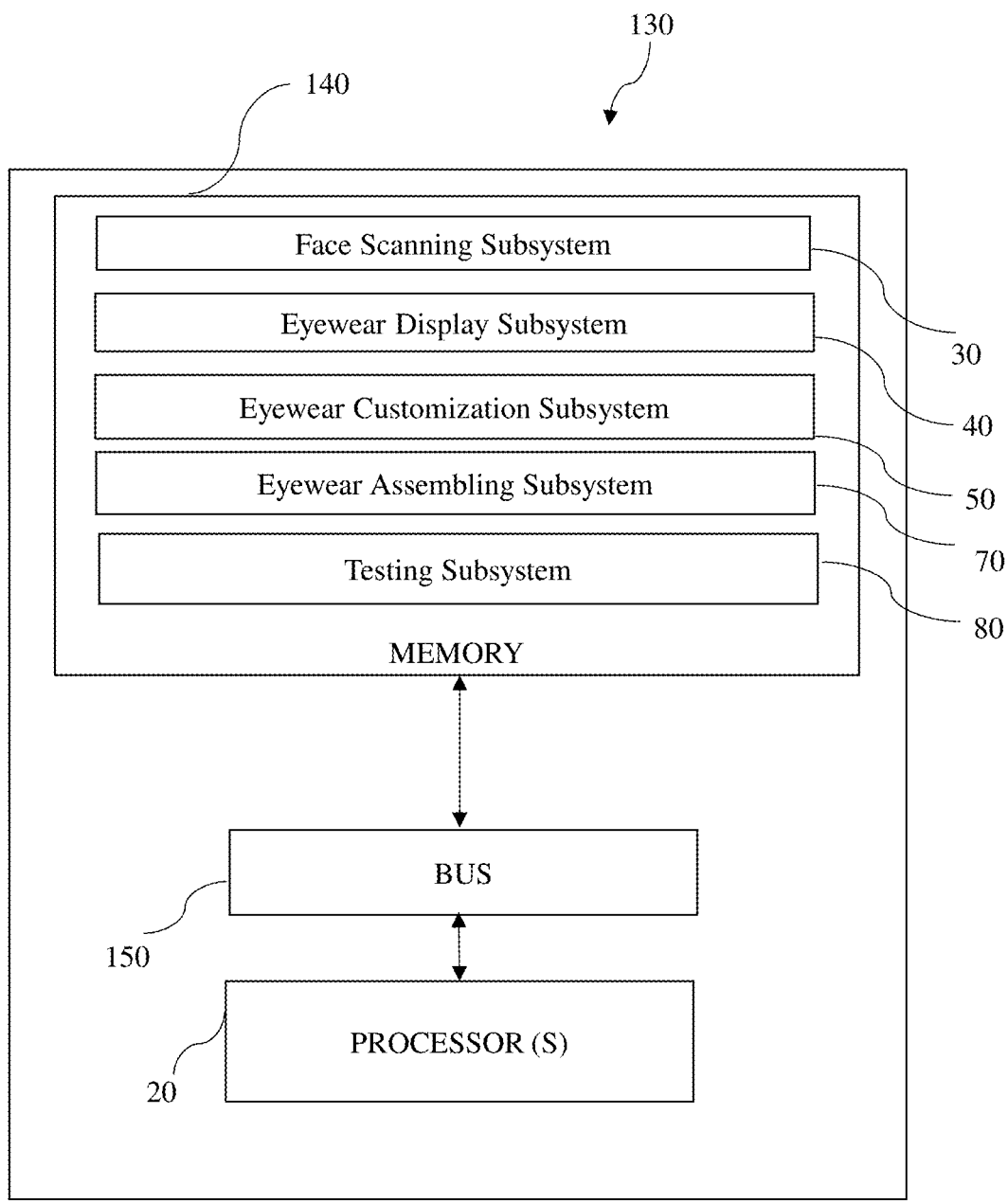
FIG. 7 is a block diagram of customization computer system or a server for an eyewear in accordance with an embodiment of the present disclosure.

FIG. 7 is a block diagram of customization computer system 130 or a server for an eyewear in accordance with an embodiment of the present disclosure. The computer system 130 includes processor(s) 20, and memory 140 coupled to the processor(s) 20 via a bus 150. The memory 140 is stored locally on a seeker device.

The processor(s) 20, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 140 includes multiple units stored in the form of executable program which instructs the processor 20 to perform the configuration of the system illustrated in FIG. 3. The memory 140 has following subsystems: a face scanning subsystem 30, an eyewear display subsystem 40, an eyewear customization subsystem 50, an eyewear assembling subsystem 70, a testing subsystem 80 and a decision subsystem 140 of FIG. 3.

Computer memory 140 elements may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) 20.

The face scanning subsystem 30 instructs the processor(s) 20 to scan a face of a user to capture one or more predefined details associated with the user in real-time using an image capturing device and generate a facial model representative of a face of the user. The eyewear display subsystem 40 instructs the processors 20 to display one or more collections of the one or more components associated with the eyewear in accordance with the one or more predefined details scanned by the face scanning subsystem. The eyewear customization subsystem 50 instructs the processor(s) 60 to receive a selection input representative of one or more components selected from the one or more collections of one or more components of the eyewear displayed by the eyewear display subsystem. The first level eyewear frame eyewear customization subsystem instructs the processor(s) 20 to receive one or more customization input representative of one or more customization parameters associated with the one or more components of the eyewear, wherein the one or more customization parameters comprise at least one of a width of the frame, a height of the frame, frame colour, frame texture, lens colour, type of nose pads and the like.

The eyewear assembling subsystem 70 instructs the processor(s) 20 to assemble the eyewear associated with the user based on the selected one or more components of the eyewear and the one or more customization inputs received by the eyewear customization subsystem. The testing subsystem 80 instructs the processors 20 to test in real time, one or more customized eyewear received from the eyewear assembly subsystem on the facial model. The second level eyewear frame eyewear customization subsystem instructs the processor(s) 60 to customize the one or more customization parameters in real time while testing the one or more customized eyewear on the facial model.

Figure 8A:
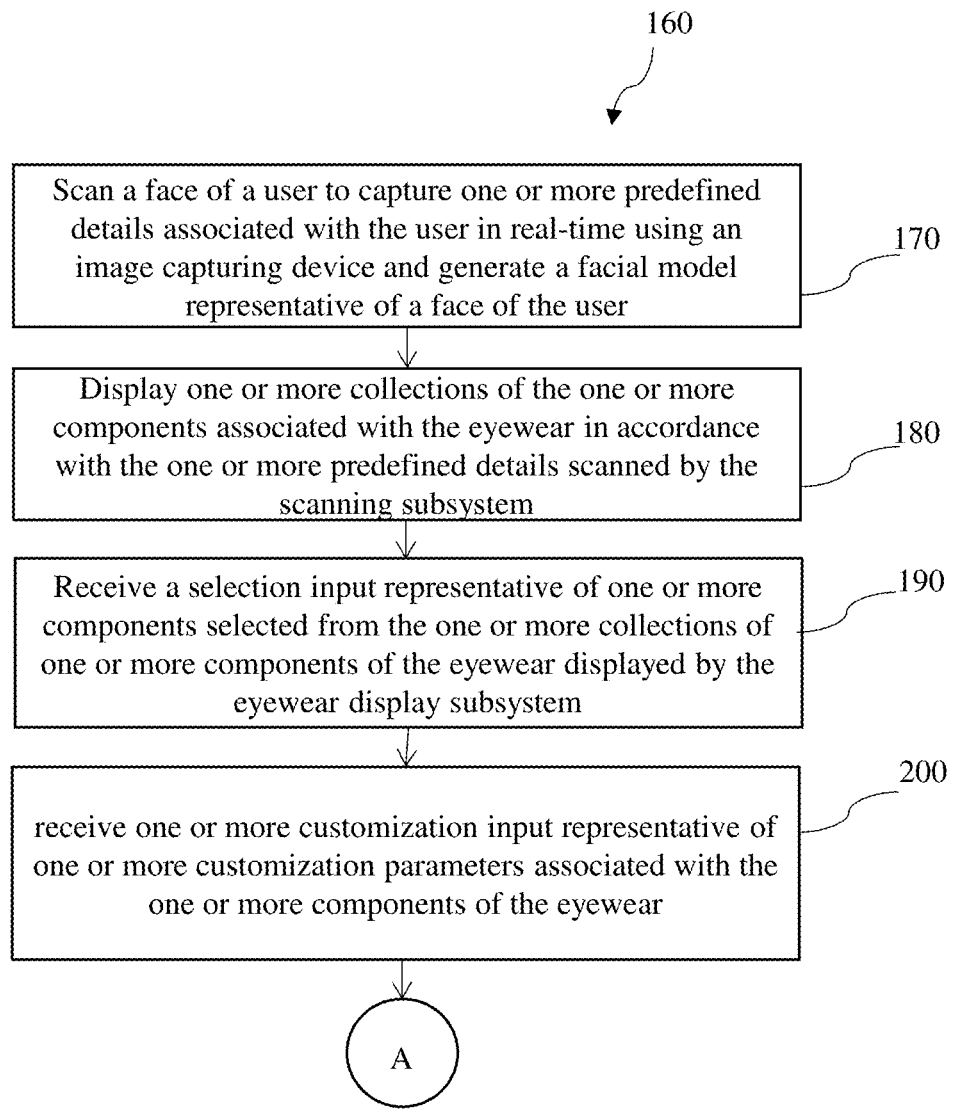
FIG. 8A and FIG. 8B are flow diagrams representing steps involved in a method for customization of an eyewear in accordance with an embodiment of the present disclosure.
Figure 8B:
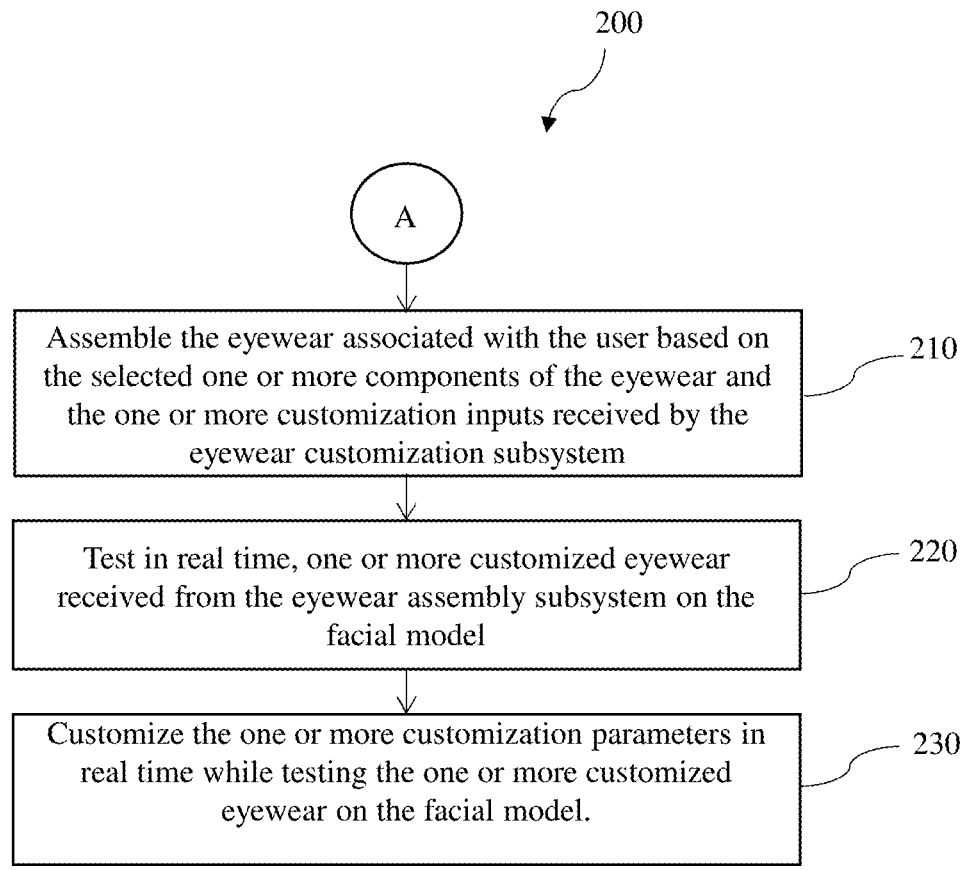

FIG. 8A and FIG. 8B are flow diagrams representing steps involved in a method 160 for customization of an eyewear in accordance with an embodiment of the present disclosure. The method 160 includes scanning, by a scanning subsystem, a face of a user to capture one or more predefined details associated with the user in real-time using an image capturing device and generate a facial model representative of a face of the user in step 170. In such embodiment, capturing the one or more predefined details may include capturing a face depth of the user and a pupillary distance of the user. In one embodiment, capturing via the image capturing device may include capturing via a depth sensor camera. In such embodiment, the method 160 may include analysing the one or more predefined details of the face of the user in real-time by the depth sensor camera.

Further, in one embodiment, the method 160 may include scanning the face of the user via one or more devices. In such embodiment, scanning via the one or more devices may include scanning via a mobile phone, a computer and the like. In one embodiment, the method 160 may include measuring the one or more predefined details in millimetres (mm). Further, in one embodiment, the method 160 may include generating, by an alarm generation subsystem, an alarm if the face scanning subsystem is unable to detect the one or more predefined details. In one embodiment, the method 160 may include notifying the user to change an alignment of the face of the user to scan the face.

Further, the method 160 includes displaying, by an eyewear display subsystem, one or more collections one or more collections of the one or more components associated with the eyewear in accordance with the one or more predefined details scanned by the face scanning subsystem in step 180. In such embodiment, displaying the one or more components of the one or more collections may include displaying frame style, lens type of eyewear, one or more decorative items, nose pad of the frame and the like. and the like. In one embodiment, displaying the nose pad may include displaying a European nose pad and the like. In one embodiment, the method 160 may include displaying one or more price values associated with the eyewear. In one embodiment, the method 160 may include displaying an information section. In such embodiment, displaying the information section may include displaying information about one or more frame styles displayed by the displaying subsystem. In such embodiment, displaying about the one or more frame styles may include displaying about a frame material, a temple material, one or more advantages associated with the frame style, a contact information and the like. In one embodiment, the method 160 may include updating the one or more components of the one or more collections after a pre-defined interval of time.

Further, the method 160 includes receiving, by an eyewear customization subsystem, a selection input representative of one or more components selected from the one or more collections of one or more components of the eyewear displayed by the eyewear display subsystem in step 190. The method 160 includes receiving, by a first level eyewear frame eyewear customization subsystem, one or more customization input representative of one or more customization parameters associated with the one or more components of the eyewear, wherein the one or more customization parameters comprise at least one of a width of the frame, a height of the frame, frame colour, frame texture, lens colour, type of nose pads and the like. In such embodiment, customizing the one or more customization parameters may include customizing a width of the frame, a height of the frame and the like. In one embodiment, the method 160 may include customizing the one or more customization parameters of the frame in accordance with the one or more predefined details scanned by the face scanning subsystem.

Further, in one embodiment, the method 160 may include customizing one or more frames of the eyewear and add the one or more frames to a wish list. In one embodiment, the method 160 may include sending one or more frame details to the system if the user is unable to find desired collection from the one or more collections via one or more connecting means. In such embodiment, sending via the one or more connecting means may include sending via an electronic mail (e-mail), a text message and the like.

Further, the method 160 includes assembling, by an eyewear assembling subsystem, the eyewear associated with the user based on the selected one or more components of the eyewear and the one or more customization inputs received by the eyewear customization subsystem in step 210. In one embodiment, the method 160 may include adding the one or more frames to the wish list after assembling the one or more eye wears.

Further, the method 160 includes testing, by a testing subsystem, in real time, one or more customized eyewear received from the eyewear assembly subsystem on the facial model in step 230. In one embodiment, the method 160 may include swapping and trying the one or more eye wears added in the wish list of the user. The method 160 includes customizing, by a second level eyewear frame eyewear customization subsystem, the one or more customization parameters in real time while testing the one or more customized eyewear on the facial model in step 220. In one embodiment, the method 160 may include changing a position of the one or more eye wears while testing the one or more eye wears in real-time. In one embodiment, the method 160 may also include sharing the one or more eye wear of the user with one or more people via the one or more connecting means.

Further, the method 160 includes receiving, by a decision subsystem, a decision of one or more selected eye wear tested by the testing subsystem. In one embodiment, the method 160 may include enabling, by a payment subsystem, the user to make a payment for the one or more selected frames decided by the decision subsystem via one or more online payment systems. In such embodiment, paying via the one or more online payment systems may include via an online payment gateway, a wallet and the like. In one embodiment, the method 160 may include providing one or more contact details during the payment checkout of the one or more selected frames. In such embodiment, providing the one or more contact details may include providing a contact number, a shipping address, a landmark and the like.

Various embodiments of the present disclosure provide a technical solution to the problem for three-dimensional customization of an eyewear. The present system provides an efficient solution which helps the user to customize the height and the width of the one or more selected eyewear to provide the best fit possible to the user. Further, the current system provides the customization of the eyewear in two different stages, wherein the first stage allows the user to customize the height and width of the eyewear and in the second stage of customization the system makes sure that the height and width fits best on the facial structure of the user in real time, which helps the system in providing a better eyewear. Further, the current system provides the user to customize and render the one or more parts of the eyewear in real time on the facial structure of the user without going back and forth, which helps in saving efforts and time.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A system for customization of an eyewear hosted on a server comprising:
    a face scanning subsystem operable by the one or more processors, wherein the face scanning subsystem is configured to scan a face of a user to capture one or more predefined details associated with the user in real-time using an image capturing device and generate a facial model representative of a face of the user, wherein the one or more predefined details comprise a face depth of the user and a pupillary distance of the user;
    an eyewear display subsystem communicatively coupled to the face scanning subsystem and operable by the one or more processors, wherein the eyewear display subsystem is configured to display one or more collections of the one or more components associated with the eyewear in accordance with the one or more predefined details scanned by the face scanning subsystem;
    an eyewear customization subsystem operable by the one or more processors, wherein the eyewear customization subsystem is configured to:
    receive a selection input representative of one or more components selected from the one or more collections of one or more components of the eyewear displayed by the eyewear display subsystem;
    a first level eyewear customization subsystem configured to receive one or more customization input representative of one or more customization parameters associated with the one or more components of the eyewear, wherein the one or more customization parameters comprise at least one of a width of the frame and a height of the frame;
    an eyewear assembling subsystem operable by the one or more processors, wherein the eyewear assembling subsystem is configured to assemble the eyewear associated with the user based on the selected one or more components of the eyewear and the one or more customization inputs received by the eyewear customization subsystem;
    a testing subsystem operable by the one or more processors, wherein the testing subsystem is configured to:
    test in real time, one or more customized eyewear received from the eyewear assembly subsystem on the facial model; and
    a second level eyewear customization subsystem configured to customize the one or more customization parameters in real time while testing the one or more customized eyewear on the facial model.

2. The system as claimed in claim 1, wherein the image capturing device comprise a depth sensor camera.

3. The system as claimed in claim 1, comprising an alarm generation subsystem operable by the one or more processors, wherein the alarm generation subsystem is configured to generate an alarm if the face scanning subsystem is unable to detect the one or more predefined details.

4. The system as claimed in claim 1, wherein the one or more components comprise a frame style, a lens type of eyewear and one or more decorative items.

5. The system as claimed in claim 1, wherein the one or more customization parameters comprise a frame colour, a frame texture, a lens colour, and a type of nose pads.

6. The system as claimed in claim 1, comprising a decision subsystem operable by the one or more processors, wherein the decision subsystem is configured to receive a decision of one or more selected eye wears tested by the testing subsystem.

7. The system as claimed in claim 6, comprising a payment subsystem operable by the one or more processors, wherein the payment subsystem is configured to enable the user to make a payment for the one or more selected frames decided by the decision subsystem via one or more online payment systems.

8. A method customization of an eyewear, the method comprising:
    scanning, by a scanning subsystem, scan a face of a user to capture one or more predefined details associated with the user in real-time using an image capturing device and generate a facial model representative of a face of the user, wherein the one or more predefined details comprise a face depth of the user and a pupillary distance of the user;
    displaying, by a displaying subsystem, one or more collections of the one or more components associated with the eyewear in accordance with the one or more predefined details scanned by the face scanning subsystem;
    receiving, by an eyewear customization subsystem, a selection input representative of one or more components selected from the one or more collections of one or more components of the eyewear displayed by the eyewear display subsystem;
    receiving, by a first level eyewear frame eyewear customization subsystem, one or more customization input representative of one or more customization parameters associated with the one or more components of the eyewear, wherein the one or more customization parameters comprise at least one of a width of the frame and a height of the frame;
    assembling, by an eyewear assembling subsystem, the eyewear associated with the user based on the selected one or more components of the eyewear and the one or more customization inputs received by the eyewear customization subsystem;

testing, by a testing subsystem, in real time, one or more customized eyewear received from the eyewear assembly subsystem on the facial model; and customizing, by a second level eyewear frame eyewear customization subsystem, the one or more customization parameters while testing the one or more frames by the testing subsystem in the real-time.

9. The method as claimed in claim 7, comprising generating, by an alarm generation subsystem, an alarm if the face scanning subsystem is unable to detect the one or more predefined details.

10. The method as claimed in claim 8, comprising receiving the one or more components, wherein the one or more components comprise a frame style, a lens type of eyewear and one or more decorative items.

11. The method as claimed in claim 7, comprising customizing the one or more customization parameters, wherein the one or more customization parameters comprise a frame colour, a frame texture, a lens colour, and a type of nose pad.

* * * * *